(12) United States Patent
Levasa et al.

(10) Patent No.: US 8,141,888 B1
(45) Date of Patent: Mar. 27, 2012

(54) SURFBOARD TRANSPORTATION DEVICE

(76) Inventors: Chevalier Z. Levasa, Kaunakakai, HI (US); Edward M. Levasa, Kaunakakai, HI (US)

( * ) Notice: Subject to any disclaimer, the term of this patent is extended or adjusted under 35 U.S.C. 154(b) by 270 days.

(21) Appl. No.: 12/651,193

(22) Filed: Dec. 31, 2009

(51) Int. Cl.
*B62B 5/00* (2006.01)
*B62B 1/00* (2006.01)

(52) U.S. Cl. .................................. 280/79.7; 280/79.11

(58) Field of Classification Search ............... 280/79.7, 280/79.11, 651
See application file for complete search history.

(56) References Cited

U.S. PATENT DOCUMENTS

| | | | | |
|---|---|---|---|---|
| 3,807,750 | A | * | 4/1974 | Brown ............................ 280/35 |
| 3,841,651 | A | * | 10/1974 | Bigney ........................ 280/47.16 |
| 3,923,318 | A | * | 12/1975 | Renard et al. ................... 280/35 |
| 4,296,878 | A | * | 10/1981 | Ward et al. ..................... 224/459 |
| 4,523,773 | A | | 6/1985 | Holtz |
| 4,602,802 | A | * | 7/1986 | Morgan .................... 280/47.331 |
| 4,712,803 | A | * | 12/1987 | Garcia ..................... 280/47.331 |
| 5,244,221 | A | * | 9/1993 | Ward ............................ 280/79.7 |
| 5,332,243 | A | * | 7/1994 | Berry ............................... 280/35 |
| 5,823,551 | A | | 10/1998 | Conroy |
| 5,951,037 | A | | 9/1999 | Hsieh et al. |
| 6,109,644 | A | | 8/2000 | Cox |
| 6,505,844 | B2 | * | 1/2003 | Hallman et al. ............. 280/79.7 |
| 6,902,175 | B1 | * | 6/2005 | Clavey ....................... 280/47.24 |
| 6,966,574 | B1 | | 11/2005 | Dahl |
| 7,017,940 | B2 | * | 3/2006 | Hatfull ........................... 280/652 |
| D528,731 | S | | 9/2006 | Cragg et al. |

* cited by examiner

*Primary Examiner* — J. Allen Shriver, II
*Assistant Examiner* — James M Dolak

(57) ABSTRACT

A surfboard transportation device for allowing a user to transport a surfboard comprising a first vertical support component connected to a second vertical support component via a first telescopic center support bar and a second telescopic center support bar. Attachment ropes can be attached to the first and second vertical support components to secure the surfboard in the device.

1 Claim, 6 Drawing Sheets

SURFBOARD TRANSPORTATION DEVICE

FIELD OF THE INVENTION

The present invention is directed to a device for transporting large objects. More particularly, the present invention is directed to a device for transporting surfboards.

BACKGROUND OF THE INVENTION

The present invention features a surfboard transportation device for allowing a user to transport a surfboard. The transportation device comprises a first vertical support component connected to a second vertical support component via center support bars. Attachment ropes can be attached to the first and second vertical support components to secure the surfboard in the device.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
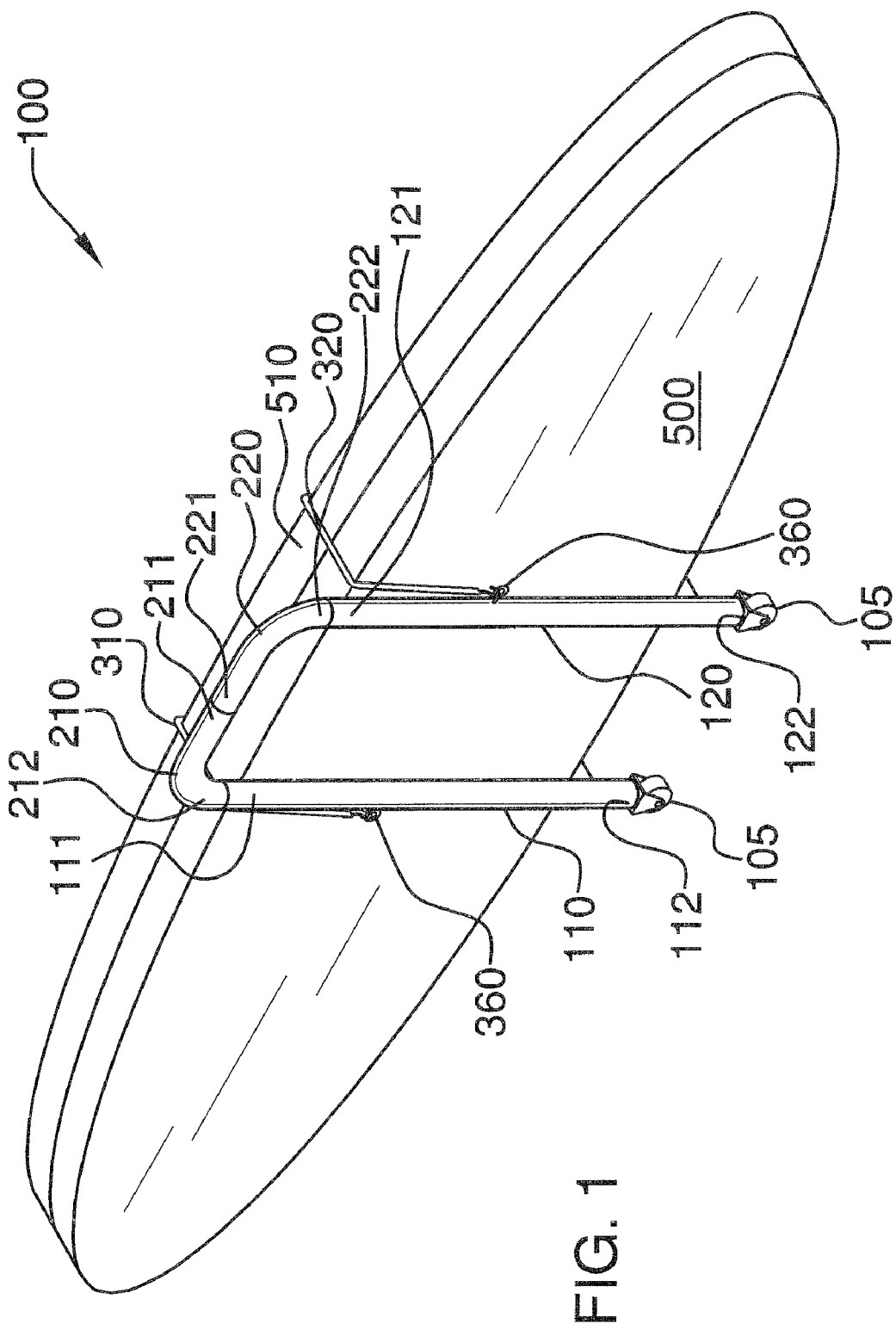
FIG. 1 is a perspective view of the surfboard transportation device of the present invention.
Figure 2:
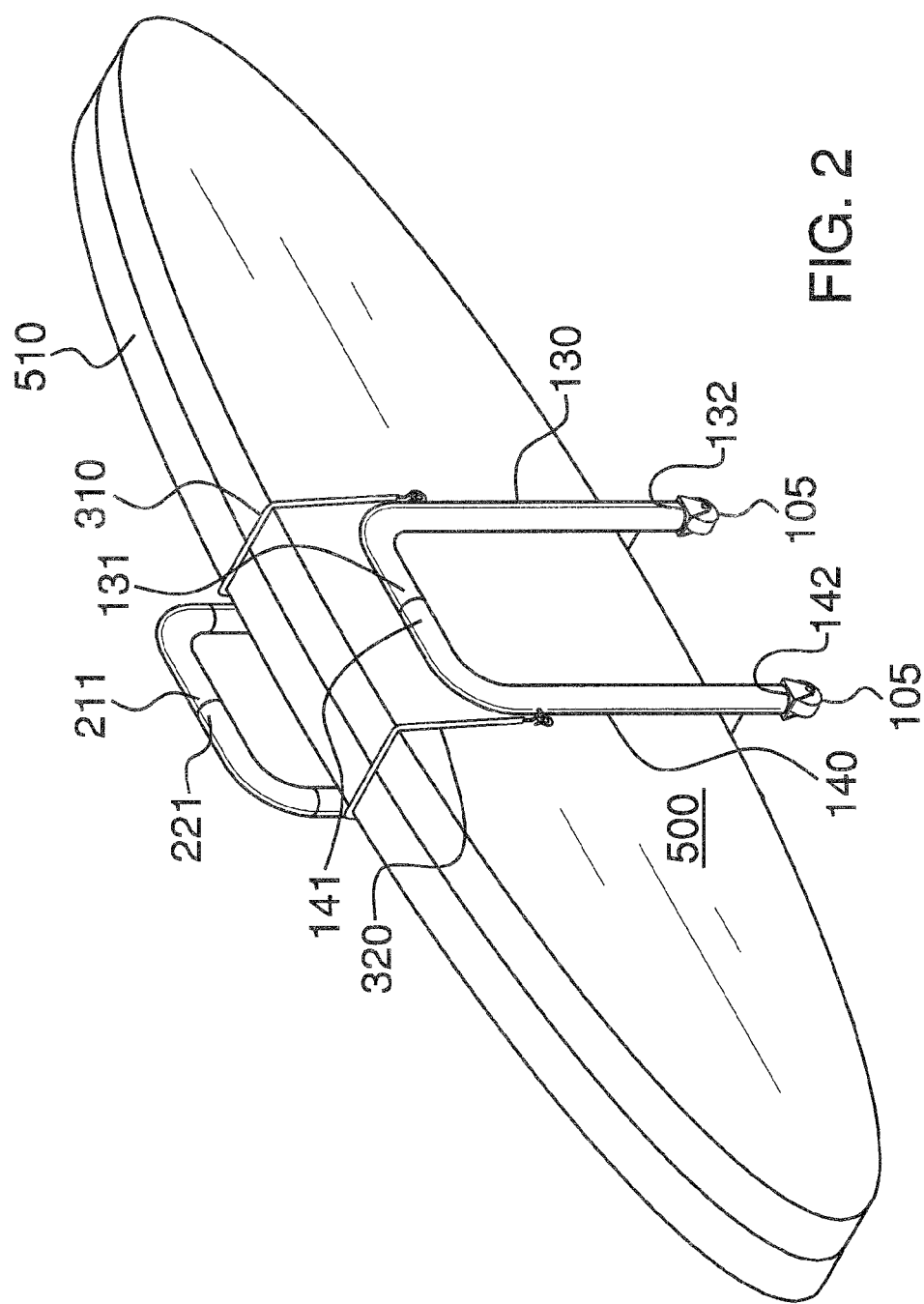
FIG. 2 is a perspective view of the surfboard transportation device of the present invention.
Figure 3:
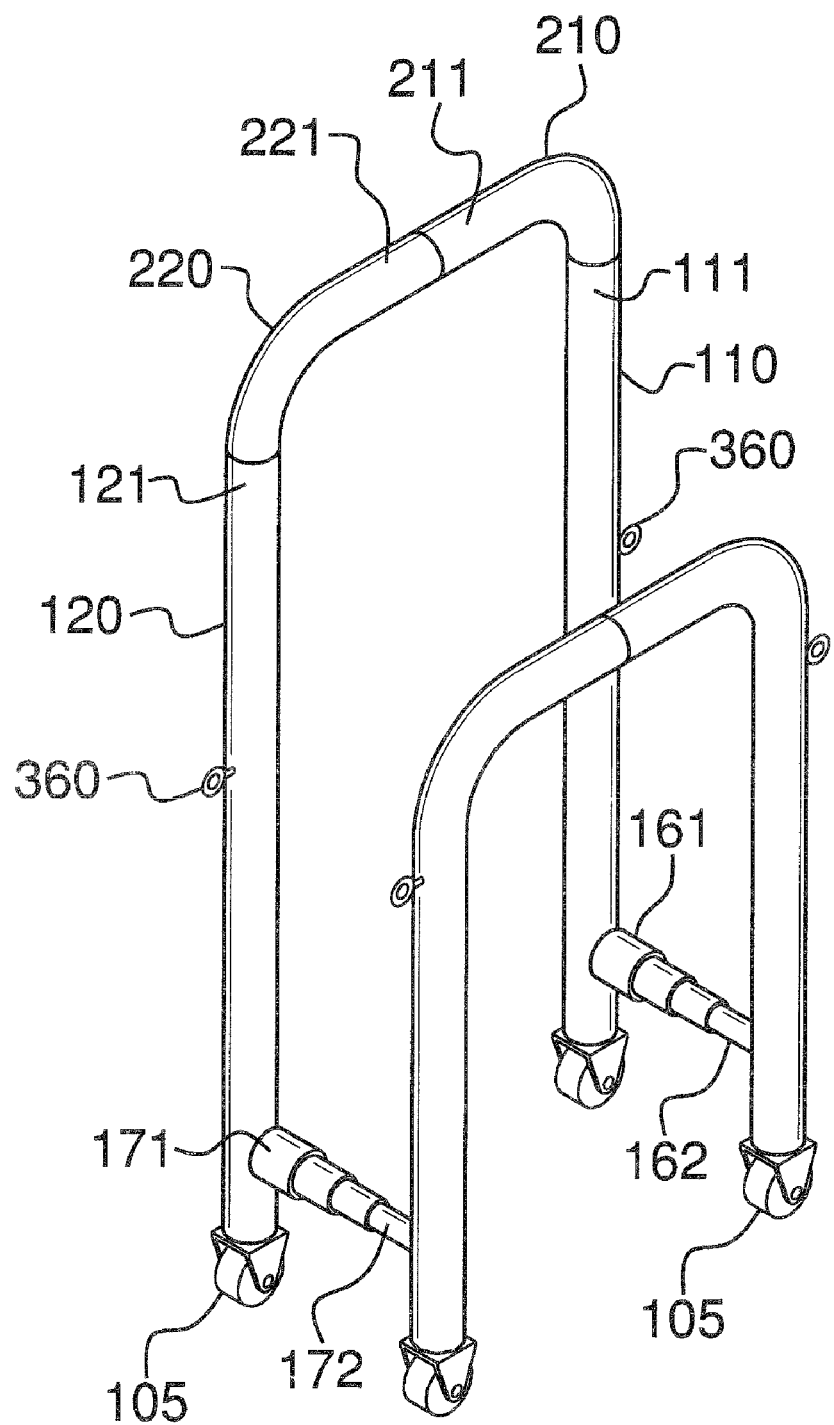
FIG. 3 is a perspective view of the surfboard transportation device of the present invention.

Referring now to FIGS. 1-6, the present invention features a surfboard transportation device 100 for allowing a user to transport a surfboard 500. The surfboard transportation device 100 comprises a generally U-shaped first vertical support component having a first vertical bar 110 having a first end 111 and a second end 112, and a second vertical bar 120 having a first end 121 and a second end 122. A first horizontal bar 210 having a first end 211 and a second end is telescopically received in the first vertical bar 110. A second horizontal bar 220 having a first end 221 and a second end is telescopically received in the second vertical bar 120.

The first end 211 of the first horizontal bar 210 is removably connected to the first end 221 of the second horizontal bar 220 via a first connecting bar 150 having a first end and a second end. The first end of the first connecting bar 150 is telescopically received in the first end 211 of the first horizontal bar 210, and the second end of the first connecting bar 150 is telescopically received in the first end 221 of the second horizontal bar 220.

Figure 4:
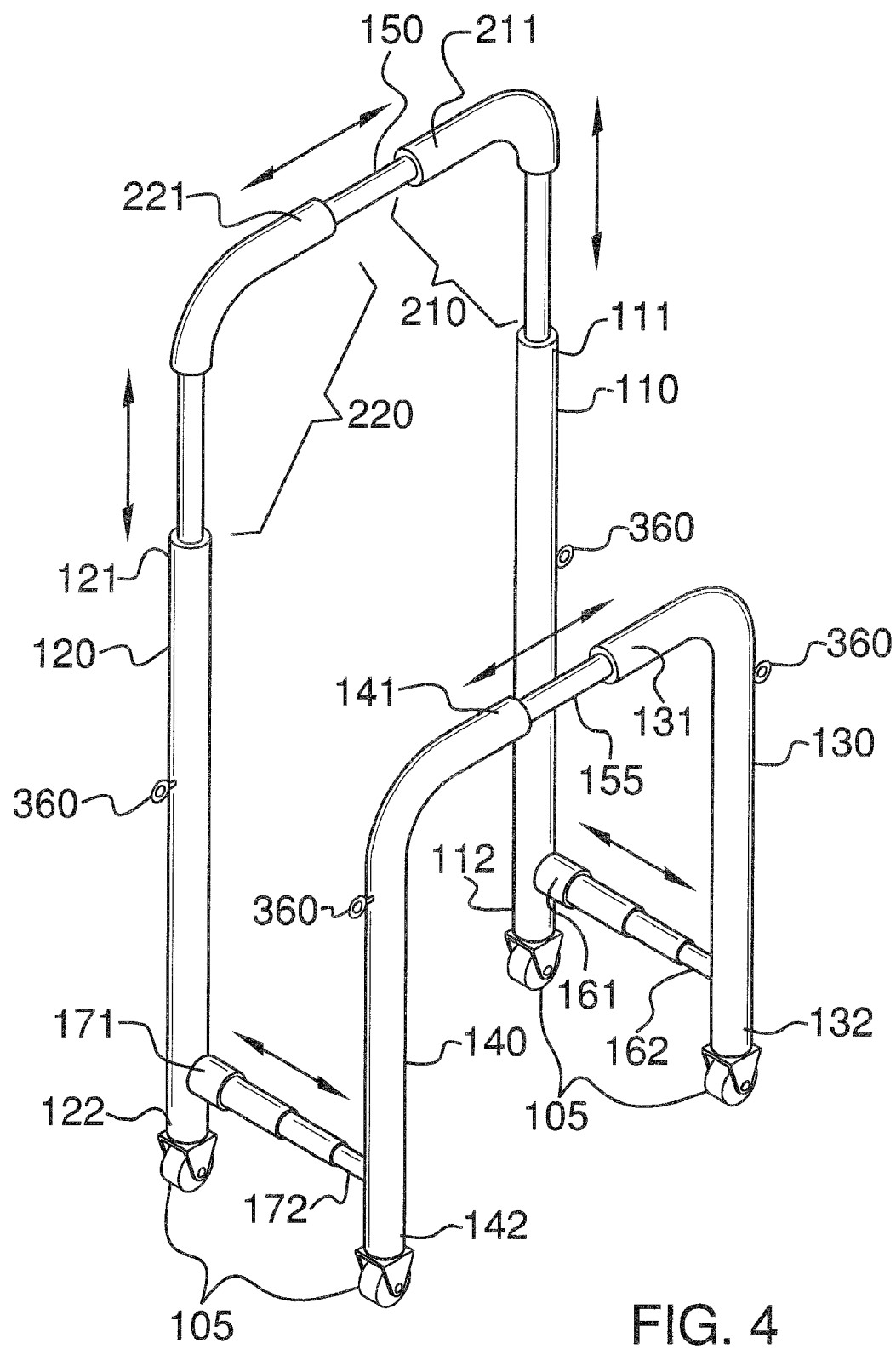
FIG. 4 is a perspective view of the surfboard transportation device of the present invention.
Figure 5:
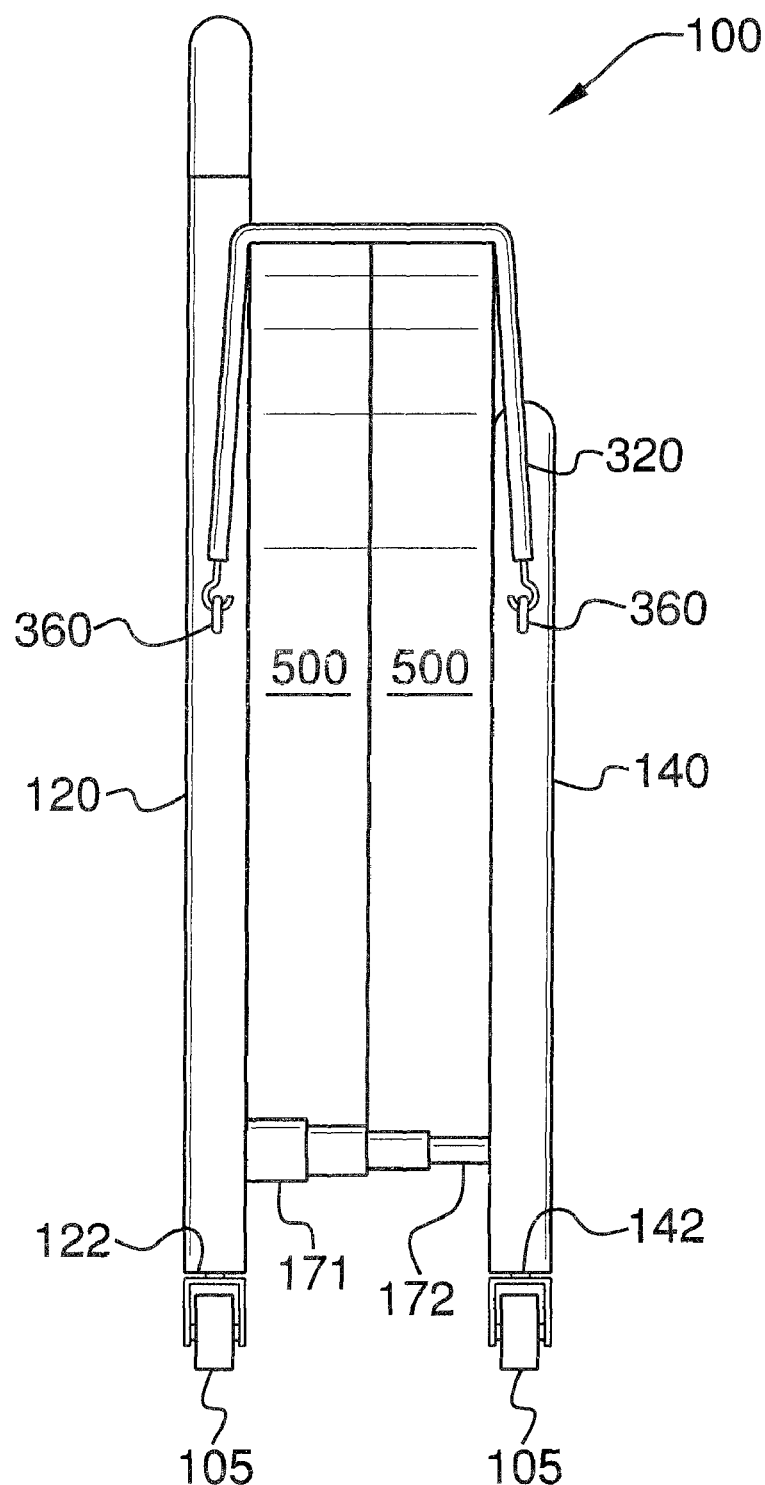
FIG. 5 is a side view of the surfboard transportation device of the present invention.
Figure 6:
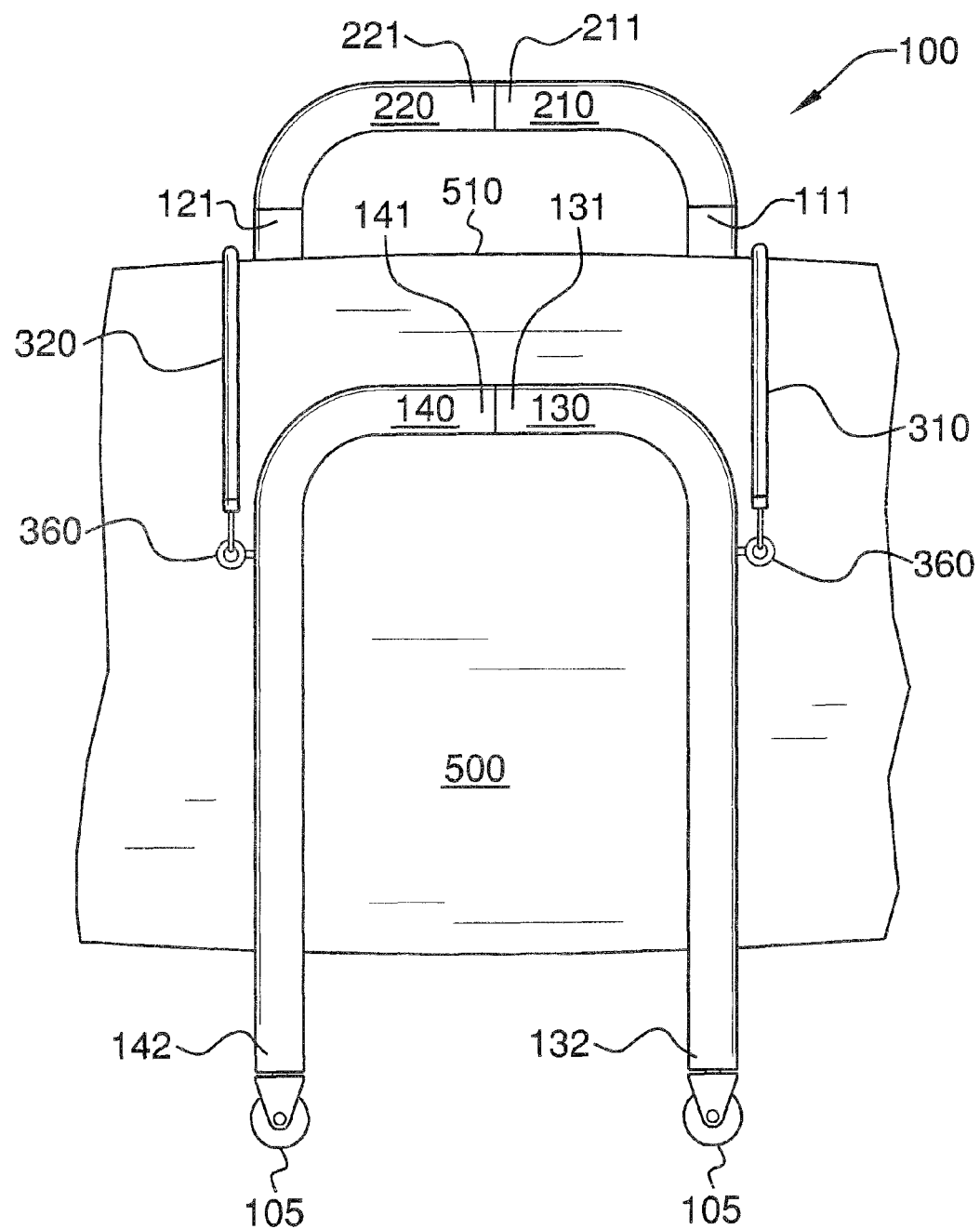
FIG. 6 is a front view of the surfboard transportation device of the present invention.

The height of the first vertical support component (e.g., as measured from the first end 211 of the first horizontal bar 210 to the second end 112 of the first vertical bar 110) can be adjusted by pushing or pulling the first and second horizontal bars in or out of the first and second vertical bars, respectively (see FIG. 4). The width of the first vertical support component (e.g., as measured from the first vertical bar 110 to the second vertical bar 120) can be adjusted by pushing or pulling the first connecting bar 150 in or out of the first or second horizontal bar (see FIG. 4).

In some embodiments, one or more apertures are disposed on the first horizontal bar 210 and/or the second horizontal bar 220. The apertures can receive a spring-loaded peg disposed on the first connecting bar 150. The peg and apertures allow a user to lock the width of the first vertical support component. Such peg and aperture mechanisms are well known to one of ordinary skill in the art.

The horizontal bars function as a handle for allowing the user to push or pull the transportation device 100. Disposed on the second end of both the first vertical bar 110 and the second vertical bar 120 is a wheel 105 (e.g., swivel wheel, caster wheel). The wheels 105 can rotate 360 degrees. The wheels are a particularly important feature because they allow the surfboard transportation device 100 to be easily maneuvered in all directions.

The surfboard transportation device 100 further comprises a generally U-shaped second vertical support component having a third vertical bar 130 having a first end 131 and a second end 132 and a fourth vertical bar 140 having a first end 141 and a second end 142. The first end 131 of the third horizontal bar is removably connected to the first end 141 of the fourth vertical bar 140 via a second connecting bar 155 having a first end and a second end. The first end of the second connecting bar 155 is telescopically received in the first end 131 of the third vertical bar 130, and the second end of the second connecting bar 155 is telescopically received in the first end 141 of the fourth vertical bar 140. The horizontal bars function as a handle for allowing the user to push or pull the transportation device 100. Disposed on the second end of both the third vertical bar 130 and the fourth vertical bar 140 is a wheel 105 (e.g., swivel wheel, caster wheel). The wheels 105 can rotate 360 degrees. The wheels are a particularly important feature because they allow the surfboard transportation device 100 to be easily maneuvered in all directions.

The width of the second vertical support component (e.g., as measured from the third vertical bar 130 to the fourth vertical bar 140) can be adjusted by pushing or pulling the second connecting bar 155 in or out of the third or fourth horizontal bar.

The second end 112 of the first vertical bar 110 is connected to the second end 132 of the third vertical bar 130 via a first telescopic center support bar having a first end 161 and a second end 162. The second end 122 of the second vertical bar 120 is connected to the second end 142 of the fourth vertical bar 140 via a second telescopic center support bar having a first end 171 and a second end 172.

The length of the first telescopic center support bar (e.g., as measured from the first end to the second end) and the length of the second telescopic center support bar can be adjusted by pushing or pulling the second vertical support component closer to or farther from the first vertical support component, respectively (see FIG. 4). The telescopic nature of the first telescopic center support bar and the second telescopic support bar allows for this movement.

The surfboard transportation device 100 further comprises a first attachment rope 310 (e.g., a bungee cord) and a second attachment rope 320 (e.g., a bungee cord), each rope having a first end and a second end and each for helping to secure the surfboard 500 on the surfboard transportation device 100. The first end of the first attachment rope 310 is removably attached to the first vertical bar 110 via first attachment means 360 (e.g., an eyelet). The second end of the first attachment rope 310 is removably attached to the third vertical bar 130 via a second attachment means 360. The first end of the second attachment rope 320 is removably attached to the second vertical bar 120 via a third attachment means 360. The second end of the second attachment rope 320 is removably attached to the fourth vertical bar 140 via a fourth attachment means 360.

In some embodiments, the surfboard transportation device 100 of the present invention further comprises a carrying case for carrying the device 100 when not in use.

The surfboard transportation device 100 of the present invention may be constructed from a variety of materials. For example, in some embodiments, the transportation device 100 may be constructed from a material comprising a metal, a plastic, the foam, a rubber, the like, or a combination thereof. In some embodiments, the vertical support components are covered with rubber or foam.

In some embodiments, a surfboard 500 can be placed in between the first vertical support component and the second vertical support component. The first attachment rope 310 and the second attachment rope 320 can be attached to their respective attachment means 360 (e.g., eyelet) and wrapped over the side 510 of the surfboard 500 so as to secure the surfboard 500 in the transportation device 100.

As used herein, the term "about" refers to plus or minus 10% of the referenced number. For example, an embodiment wherein the vertical support component is about 30 inches in height includes a vertical support component that is between 27 and 33 inches in height.

The surfboard transportation device of the present invention may be constructed in a variety of sizes. For example, in some embodiments, the first vertical support component is between about 20 to 25 inches in height as measured from the first end of the first horizontal bar to the second end of the first vertical bar. In some embodiments, the first vertical support component is between about 25 to 30 inches in height as measured from the first end of the first horizontal bar to the second end of the first vertical bar. In some embodiments, the first vertical support component is between about 30 to 35 inches in height as measured from the first end of the first horizontal bar to the second end of the first vertical bar. In some embodiments, the first vertical support component is more than about 35 inches in height.

In some embodiments, the second vertical support component is between about 15 to 20 inches in height as measured from the first end of the third vertical bar to the second end of the third vertical bar. In some embodiments, the second vertical support component is between about 20 to 25 inches in height as measured from the first end of the third vertical bar to the second end of the third vertical bar. In some embodiments, the second vertical support component is more than about 25 inches in height.

In some embodiments, the first center support bar and/or the second center support bar is between about 4 to 6 inches in length as measured from the first end to the second end. In some embodiments, the first center support bar and/or the second center support bar is between about 6 to 10 inches in length as measured from the first end to the second end.

In some embodiments, the wheels are between about 2 to 3 inches in diameter. In some embodiments, the wheels are more than about 3 inches in diameter.

In some embodiments, the first/second/third/fourth vertical bar and/or the first/second horizontal bar and/or the first/second telescopic center support bar is between about 1 to 2 inches in diameter. In some embodiments, the first/second/third/fourth vertical bar and/or the first/second horizontal bar and/or the first/second telescopic center support bar is between about 2 to 3 inches in diameter. In some embodiments, the first//second/third/fourth vertical bar and/or the first/second horizontal bar and/or the first/second telescopic center support bar is between about 3 to 4 inches in diameter.

As used herein, the term "about" refers to plus or minus 10% of the referenced number. For example, an embodiment wherein the first vertical bar is about 2 inches in diameter includes a first vertical bar that is between 1.8 and 2.2 inches in diameter.

The disclosures of the following U.S. Patents are incorporated in their entirety by reference herein: U.S. Pat. No. 5,823,551; U.S. Pat. No. 6,966,574 B1; U.S. Pat. No. 5,951,037; U.S. Pat. No. 4,523,773; U.S. Pat. No. 6,109,644.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A surfboard transportation device for allowing a user to transport a surfboard, said surfboard transportation device comprising:
   (a) a generally U-shaped first vertical support component comprising a first vertical bar having a first end and a second end, and a second vertical bar having a first end and a second end;
   (b) a first horizontal bar having a first end and a second end, wherein the first horizontal bar is telescopically received in the first vertical bar;
   (c) a second horizontal bar having a first end and a second end, wherein the second horizontal bar is telescopically received in the second vertical bar; wherein the first horizontal bar and the second horizontal bar function as a handle for allowing the user to push or pull the transportation device; wherein a height of the first vertical support component as measured from the first end of the first horizontal bar to the second end of the first vertical bar can be adjusted by pushing or pulling the first horizontal bar and the second horizontal bar in or out of the first vertical bar and the second vertical bar, respectively;
   (d) a first connecting bar for connecting the first horizontal bar to the second horizontal bar; wherein the first connecting bar has a first end and a second end, wherein the first end of the first connecting bar is telescopically received in the first end of the first horizontal bar, wherein the second end of the first connecting bar is telescopically received in the first end of the second horizontal bar; wherein a width of the first vertical support component as measured from the first vertical bar to the second vertical bar can be adjusted by pushing or pulling the first connecting bar in or out of the first horizontal bar or the second horizontal bar;
   (e) a generally U-shaped second vertical support component comprising a third vertical bar having a first end and a second end, and a fourth vertical bar having a first end and a second end;
   (f) a second connecting bar for connecting the third vertical bar to the fourth vertical bar, wherein the second connecting bar has a first end and a second end; wherein the first end of the second connecting bar is telescopically received in the first end of the third vertical bar; wherein the second end of the second connecting bar is telescopically received in the first end of the fourth vertical bar; wherein a width of the second vertical support component as measured from the third vertical bar to the fourth vertical bar can be adjusted by pushing or pulling the second connecting bar in or out of the third horizontal bar or the fourth horizontal bar;

(g) a first telescopic center support bar for connecting the second end of the first vertical bar to the second end of the third vertical bar; wherein the first telescopic center support bar has a first end and a second end, (h) a second telescopic center support bar for connecting the second end of the third vertical bar to the second end of the fourth vertical bar; wherein the second telescopic center support bar has a first end and a second end; wherein a length of the first telescopic center support bar as measured from the first end to the second end and a length of the second telescopic center support bar as measured from the first end to the second end can be adjusted by pushing or pulling the second vertical support component closer to or farther from the first vertical support component, respectively;

(i) a wheel disposed on each of the second end of the first vertical bar, the second end of the second vertical bar, the second end of the third vertical bar, and the second end of the fourth vertical bar, wherein the wheel can rotate 360 degrees so as to allow the surfboard transportation device to be easily maneuvered in any direction;

(j) a first attachment rope for helping to secure the surfboard on the surfboard transportation device, wherein the first attachment rope has a first end and a second end; wherein the first end of the first attachment rope is removably attached to the first vertical bar via a first attachment means; wherein the second end of the first attachment rope is removably attached to the third vertical bar via a second attachment means; and (k) a second attachment rope for helping to secure the surfboard on the surfboard transportation device; wherein the second attachment rope has a first end and a second end; wherein the first end of the second attachment rope is removably attached to the second vertical bar via a third attachment means; wherein the second end of the second attachment rope is removably attached to the fourth vertical bar via a fourth attachment means;

wherein the surfboard can be placed in between the first vertical support component and the second vertical support component; wherein the first attachment rope and the second attachment rope can be wrapped over a side of the surfboard so as to secure the surfboard in the surfboard transportation device.

* * * * *